(12) United States Patent
Zhai et al.

(10) Patent No.: US 11,392,020 B2
(45) Date of Patent: Jul. 19, 2022

(54) AUTOFOCUS PROJECTION APPARATUS HAVING FOCAL-LENGTH FINE ADJUSTMENT, AND PROJECTION LIGHT ENGINES INCLUDING THE SAME

(71) Applicant: DigiEngin Optoelectronics Taizhou Ltd., Co., Zhejiang (CN)

(72) Inventors: Jinhui Zhai, Union City, CA (US); Lin Li, Union City, CA (US); Xiaoli Yin, Union City, CA (US)

(73) Assignee: Digiengin Optoelectronics Taizhou Ltd., Co., Zhejian (CN)

( * ) Notice: Subject to any disclaimer, the term of this patent is extended or adjusted under 35 U.S.C. 154(b) by 0 days.

(21) Appl. No.: 17/105,796

(22) Filed: Nov. 27, 2020

(65) Prior Publication Data

US 2022/0171272 A1 Jun. 2, 2022

(51) Int. Cl.
*G03B 21/53* (2006.01)
*G01S 17/894* (2020.01)
*G02B 7/09* (2021.01)
*G03B 21/14* (2006.01)

(52) U.S. Cl.
CPC ............ *G03B 21/53* (2013.01); *G01S 17/894* (2020.01); *G02B 7/09* (2013.01); *G03B 21/142* (2013.01)

(58) Field of Classification Search
CPC .... G03B 21/006; G03B 21/008; G03B 21/28; G03B 21/53; G03B 21/145; G03B 21/208; G03B 21/2013; G03B 21/2033; G03B 21/2053; H04N 9/315; H04N 9/317; H04N 9/3141; H04N 9/3144; H04N 9/3155; G02B 7/02; G02B 7/04; G02B 7/09; G02B 7/021; G02B 7/022; G02B 7/023; G02B 7/0955; G02B 7/102; G01S 17/89; G01S 17/894
See application file for complete search history.

(56) References Cited

U.S. PATENT DOCUMENTS

| | | | |
|---|---|---|---|
| 8,690,356 B2* | 4/2014 | Kakuta | G02B 27/0994 353/38 |
| 2004/0027476 A1* | 2/2004 | Masuda | H04N 5/2254 348/335 |
| 2004/0062534 A1* | 4/2004 | Masuda | G02B 7/102 396/61 |

(Continued)

*Primary Examiner* — Sultan Chowdhury
(74) *Attorney, Agent, or Firm* — Gavrilovich, Dodd & Lindsey LLP (57) ABSTRACT

An autofocus projection apparatus having focal-length fine adjustment is disclosed. A projection light engine including the same is also disclosed. The autofocus projection apparatus comprises a projection lens system, which comprises a first lens group, a second lens group, an aperture stop, a third lens group and a forth lens group arranged from a long conjugate side to a short conjugate side; a stepper motor, a control board, and a time-of-flight (TOF) distance measurement module; wherein the stepper motor is connected to an inner barrel for enclosing the second group lens through an adjustment level and only moves the second lens group for autofocus adjustment based on projection distances measured by the TOF distance measurement module. A 3D TOF module which includes a modulated flash light emitter and a CMOS camera sensor, can be used for automatic keystone correction as well as autofocus distance detection in the projection light engine.

20 Claims, 4 Drawing Sheets

(56) References Cited

U.S. PATENT DOCUMENTS

| | | | |
|---|---|---|---|
| 2008/0204904 A1* | 8/2008 | Mizuno | G02B 7/005 359/811 |
| 2015/0022907 A1* | 1/2015 | Yamamoto | G02B 23/243 359/749 |
| 2017/0363836 A1* | 12/2017 | Shimizu | G03B 21/16 |
| 2019/0235363 A1* | 8/2019 | Takehana | G02B 7/021 |

* cited by examiner

AUTOFOCUS PROJECTION APPARATUS HAVING FOCAL-LENGTH FINE ADJUSTMENT, AND PROJECTION LIGHT ENGINES INCLUDING THE SAME

TECHNICAL FIELD

The disclosed technology relates to projection apparatus, and particularly to autofocus projection apparatus for various applications such as projection display engines, digital camera system, and mobile phone camera. Furthermore, the disclosed technology relates to projection light engines including the autofocus projection apparatus.

BACKGROUND

There is a need for focusing adjustment when projecting an image at the different distances or capture images from the various distances. For example, in projection display application, the screen may be located at different projection distances. In digital camera system or mobile camera, the objects may be located at different distances. Traditional method for focusing adjustment is to move the entire image projection lens, which have a fixed focal length, back and forth along the optical axis to make the image in focus.

There is also a need for autofocus adjustment in the imaging applications, like projection display and digital camera system. A high accuracy stepper motor is used to move image projection lens body back and forth along the optical axis for autofocus micro adjustment. A CMOS camera sensor is used for feedback of a clear image formed to control the stepper motor, wherein a control system using contrast detection or phase detection analysis algorithms to feedback that the sharp image is formed. Recently, time-of-flight (TOF) auto focus method using an infrared laser has been used in high end smart phone, which have advantage of super-fast and for low light condition. It emits a beam of infrared light towards the object and calculates the time for the light to be reflected and is then able to calculate the distance to the object. The calculated distance is used to control the stepper motor.

In projection display applications, when an aspheric plastic lens is used in projection lens system, the image may be out of focusing when turning on for a certain time due to getting hot, called "thermal defocus" phenomenon. Accordingly, it may be needed to re-focus after the projector running for a while with the projection lens having an aspheric plastic lens.

In projection display applications, there is also a need for keystone correction. If the projector axis is not placed perpendicularly to the projection screen, the image on the screen will have a keystone. When the keystone happens, it needs to manually adjust the projector position to make the projector positioned perpendicularly to the projection screen.

Normally, the entire projection lens body, which have a fixed focal-length, is moved back and forth along the optical axis for focusing adjustment and a stepper motor may be needed to control the movement with contrast detection when needs autofocus adjustment. There is a challenge to move the entire projection lens body in autofocus adjustment or "thermal defocus" compensation due to the mass of projection lens. The projection lens is usually quite big and heavy for big panel projection system, either micro-display projection such as DLP or LCOS, or CCD imaging system, so a big motor may be needed, which makes the volume of the projection apparatus bulky. Another challenge of moving a fixed focal-length lens body is that image quality may have big degradation when moving too close or too far. Moreover, contrast detection autofocus control methods have issue of long adjustment time, usually need over 1 second.

It will have great advantage if only one or two lenses inside the projection lens can be used for focusing adjustment or "thermal defocus" compensation, so that a small stepper motor can be used for autofocus in a compact size projection module. It will be greatly reducing the adjustment time if TOF (time-of-flight) auto focus using infrared laser can be used to control motor in autofocus adjustment and "thermal defocus" compensation.

SUMMARY

In order to use a small motor for autofocus adjustment in projection system, like projection display engines or digital camera system, an innovative focal-length fine adjustment method is disclosed in this invention by only moving one group of projection lens. The innovative autofocus projection apparatus comprises a projection lens system, which comprises a first lens group, a second lens group, an aperture stop, a third lens group and a forth lens group arranged from a long conjugate side to a short conjugate side; a stepper motor; a control board, and a time-of-flight (TOF) distance measurement module; wherein said stepper motor is connected to said second group lens through an adjustment level and only moves said second lens group for autofocus control based on projection distances measured by the TOF distance measurement module; wherein the focal-length of said projection lens system has a fine change during autofocus adjustment.

In this innovative autofocus projection apparatus, the projection lens system may comprise an inner lens barrel for the second lens group only and an outer lens barrel for the main projection lens body comprising the first, third and fourth lens groups, the inner lens barrel and the outer lens barrel have a tight tolerance fitting for smooth focusing adjustment. The inner barrel with the second lens group is light and small, so only a small motor is needed to move the second lens group back and forth along the optical axis during auto-focusing adjustment for a compact design. The outer lens barrel with the main projection lens body will not be moved during focusing adjustment. In the TOF distance detection module, it emits a beam of infrared light towards the object and calculates the time for the light to be reflected and is then able to calculate the distance from the TOF distance detection module to the object. The calculated distance is used to control the stepper motor to move the second lens group to the proper position based on a look-up table or algorithm, which is written on the control board. With TOF distance detection method, it may only take less than 0.3 second for autofocus adjustment once.

In the projection lens system, it may comprise a first lens group, a second lens group, a third lens group and a fourth lens group arranged from a long conjugate side to a short conjugate side, and the projection lens system further comprises an aperture stop between the second lens group and the third lens group. The first lens group usually have negative refractive power to accept wide field of view rays and for off-axis image aberration correction. The first lens group may include an aspherical surface lens. The second lens group may have positive refractive power for off-axis aberration and high order spherical aberration correction. The second lens group may be just a single double-convex lens. The second lens group can be also used for projection distance focusing, tolerance compensation and "thermal defocus" compensation. The first lens group and the second lens group are arranged before the aperture stop, and the combination of the first lens group and second lens group has positive refractive power with focal-length between 10 mm and 35 mm, preferably between 15 mm and 30 mm. The third lens group after the aperture stop has positive refractive power and may be a cemented lens made from a high refractive index material lens and a high Abbe value material lens for color aberration and spherical aberration. The third lens group may comprise negative double-concave lens made from high refractive index and low Abbe value glass material and a positive double-convex lens made from low refractive index and high Abbe value glass material. The fourth lens group may have a positive refractive power for high order aberration, color aberration and distortion correction. The fourth lens group may include an aspherical surface lens. The third lens group and the four lens group may be combined into one rear lens group lens, and the combination of the third lens group and the fourth lens group has positive refractive power with focal-length between 5 mm and 20 mm, preferably between 9 mm and 18 mm. The projection lens system is tele-centric lens system.

In another aspect, the combination of said first lens group and said second lens group has negative refractive power with focal-length between −275 mm and −525 mm, preferably between −300 mm and −500 mm; and the combination of the third lens group and the fourth lens group has positive refractive power with focal-length between 10 mm and 30 mm, preferably between 15 mm and 22 mm.

When the projection lens system includes an aspheric plastic lens, it may have "thermal defocus" phenomena after running for a while. Plastic lens material is more sensitive to temperature, which causes MTF drop, so the projection lens system needs to do re-focus after running for a while. When this happens, in this innovative projection apparatus, the second lens group can be used for "thermal defocus" automatic compensation based on temperature feedback and control algorithm. A thermal sensor may need to monitor temperature change around the outer lens barrel. When the thermal sensor monitors a temperature change, the control board generates a control signal based on the temperature change and control algorithm written on the control board, and sends to the motor, and then the motor moves the second lens group to perform thermal defocus automatic compensation based on the control signal.

In another aspect, a projection light engine with this autofocus projection apparatus is disclosed. The projection light engine with the innovative autofocus apparatus comprises a projection lens system, which comprises a first lens group, a second lens group, an aperture stop, a third lens group and a forth lens group arranged from a long conjugate side to a short conjugate side; a stepper motor; a control board; a time-of-flight (TOF) distance measurement module; a micro-display panel; and a light engine illumination system, wherein, the stepper motor is connected to the second group lens through an adjustment level and only move the second lens group for autofocus control based on projection distances measured by the TOF distance measurement module. The micro-display panel is used to display the video images and the images will be projected on the screen through said projection lens system. The light engine illumination system comprises at least a red, green and blue light beams which have been combined with dichroic mirrors into co-axial light path without etendue increase and illuminate the micro-display panel with uniform beam pattern.

This projection light engine has autofocus adjustment capability by only moving the second lens group with a small motor for different projection distances and compensate any defocus by lens assembly tolerance and thermal effect. In some cases, due to projection lens assembly tolerance and accuracy of look-up table for time-of-flight (TOF) detection algorithm, the image on the screen may be not clear and sharp. If this happens, an infrared camera module may be needed in the projection light engine. The infrared camera module captures the image on the screen and an algorithm is used to analyze the image quality, such as contrast ratio, so as to judge if a clear and sharp image is displayed on the screen. If the image is not clear and sharp, the motor may move the second lens group in a small step to do re-focus and check if the image is in focus.

When a 3D TOF module is used for the projection light engine, it can automatically correct the keystone distortion as well as for projection distance detection. The 3D TOF module will include an infrared VESEL or LED light device and a CMOS camera sensor. The 3D TOF module can project a single modulated, flash light onto an object, which can be a projection screen. The reflected light is captured by the TOF camera sensor, which measures depth, amplitude and phase difference per pixel. The result is a highly reliable image of the distance or depth plus a gray-scale picture of the entire scene, which is used for keystone distortion correction. As one of alternative methods, the modulated flash light source may be integrated into the projection light engine illumination system, or may be just acted as one light engine illumination light source, so only a TOF camera sensor is needed for the 3D TOF module to do automatic keystone correction.

The scope of the present invention is defined by the claims. A more complete understanding of embodiments of the present disclosure will be afforded to those skilled in the art, as well as a realization of additional advantages thereof, by a consideration of the following detailed description of one or more embodiments.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
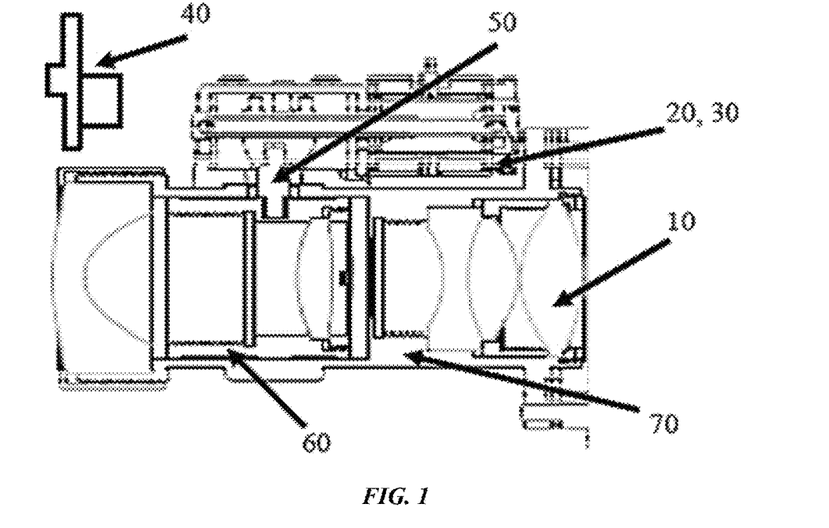
FIG. 1 shows an autofocus projection apparatus according to the first embodiment of the present invention.
Figure 2:
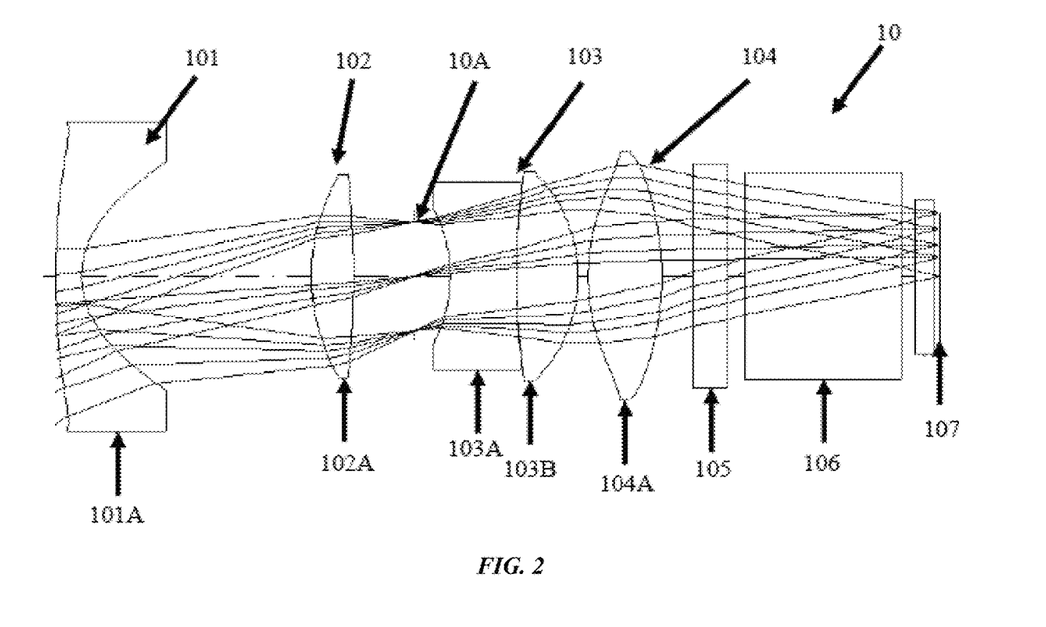
FIG. 2 illustrates autofocus projection lens system according to the first embodiment of the present invention.

The first embodiment of an autofocus projection apparatus according to the present invention is shown in FIG. 1. The autofocus projection apparatus comprises a projection lens system 10; a stepper motor 20; a control board 30; and a time-of-flight (TOF) distance measurement module 40. The projection lens system is shown in FIG. 2 in detail. The projection lens system comprises a first lens group 101, a second lens group 102, an aperture stop 10A, a third lens group 103 and a forth lens group 104 arranged from a long conjugate side to a short conjugate side. As shown in FIGS. 1-2, the autofocus projection apparatus further comprises an adjustment level 50, an inner lens barrel 60 and an outer lens barrel 70, and wherein the inner lens barrel 60 is used for enclosing the second lens group 102 only and the outer lens barrel 70 is used for enclosing the main projection lens body comprising the first, third and fourth lens groups 101, 103, 104, the inner lens barrel 60 and the outer lens barrel 70 have a tight tolerance fitting for smooth focusing adjustment. One end of the adjustment level 50 is connected to the inner lens barrel 60 for enclosing said second lens group 102, and the other end of the adjustment level 50 is connected to the stepper motor 20 and the control board 30 so that the stepper motor 20 together with the control board 30 can control the movement of the second group lens 102 through the adjustment level 50. The stepper motor 20 can be mounted on the outer lens barrel 70. In the TOF distance detection module 40, it emits a beam of infrared light towards the object and calculates the time for the light to be reflected and is then able to calculate the distance from the TOF distance detection module 40 to the object. According to the calculated distance from the TOF distance detection module 40 and a look-up table or algorithm, which is written on the control board 30, the control board 30 can generate a control signal, which is used to control the stepper motor to move the inner lens barrel 60 of the second lens group 102 back and forth along the optical axis to a proper position through the adjustment level 50.

In this way, only the inner lens barrel 60 of the second lens group 102 will be moved for autofocus control, and the outer lens barrel 70 with the main projection lens body will not be moved during auto-focusing adjustment. The inner lens barrel 60 with the second lens group 102 is light and small, so only a small motor is needed to move the second lens group back and forth along the optical axis during autofocusing adjustment for a compact design. The focal-length of said projection lens system 10 has a fine change during autofocus adjustment. With time-of-flight distance detection, it may only take less than 0.3 second for autofocus adjustment.

Back to FIG. 2, in the first embodiment of the projection lens system 10, which includes only 5 pieces of optical lens elements for a 0.23" DLP projection system, the first lens group 101 may have negative refractive power to collect wide field of view rays and for off-axis image aberration correction. The first lens group 101 may include an aspherical surface lens 101A. The second lens group 102 may have positive refractive power for off-axis aberration correction and high order spherical aberration correction. The second lens group 102 may be just a single double-convex lens 102A. The second lens group 102 can be also used for projection distance focusing, tolerance compensation and "thermal defocus" compensation. The first lens group 101 and the second lens group 102 are arranged before the aperture stop 10A, and the combination of the first lens group 101 and the second lens group 102 has positive refractive power with focal-length between 10 mm and 35 mm, preferably between 15 mm and 30 mm. The third lens group 103 after the aperture stop 10A has positive refractive power, and may be a cemented lens made from a high refractive index material lens and a high Abbe value material lens for color aberration and spherical aberration. In the first embodiment of the projection lens system, the third lens group 103 comprises negative double-concave lens 103A made from high refractive index and low Abbe value glass material and a positive double-convex lens 103B made from low refractive index and high Abbe value glass material. The fourth lens group 104 may have a positive refractive power for high order aberration, color aberration and distortion correction. The fourth lens group 104 may include an aspherical surface lens 104A. The third lens group 103 and the fourth lens group 104 may be combined into one rear lens group lens, and the combination of the third lens group 103 and the fourth lens group 104 has positive refractive power with focal-length between 5 mm and 20 mm, preferably between 9 mm and 18 mm. The light reflected by the micro-display panel 107 will pass through the TIR prism 106 and a plate 105, and then emits through the fourth, third, second and first lens groups respectively and is finally projected on a projection screen. The projection lens system 10 is tele-centric lens system.

As an alternative, the autofocus projection apparatus may further comprise a thermal sensor (not shown) for monitoring temperature changes around the lens barrels. The lens from the first lens group and the fourth lens group may be aspherical plastic lens. When an aspheric plastic lens is used in a projection lens system, as the plastic lens material is more sensitive to temperature, which causes MTF drop, the image may be out of focusing when turning on for a certain time due to getting hot, called "thermal defocus" phenomenon. Accordingly, it may be needed to re-focus after the projection apparatus running for a while with the projection lens system having an aspheric plastic lens. When the thermal sensor monitors a temperature change around the lens barrels, the control board 30 will generate a control signal to the motor 20 based on the temperature change monitored by the thermal sensor and control algorithm. Then the motor 20 will move the second lens group 102 to perform "thermal defocus" automatic compensation based on the control signal from the control board 30. Furthermore, with time-of-flight distance detection method, it may only take less than 0.3 second for both autofocus adjustment and "thermal defocus" compensation.

Figure 3:
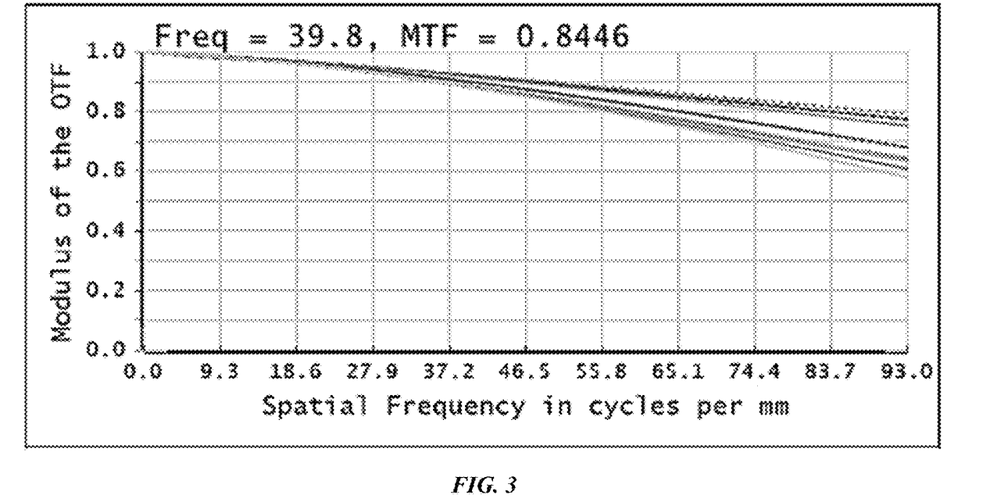
FIG. 3 shows a graph of MTF of the projection lens system for 1.2 m projection distance according to the first embodiment of the present invention.
Figure 4A:
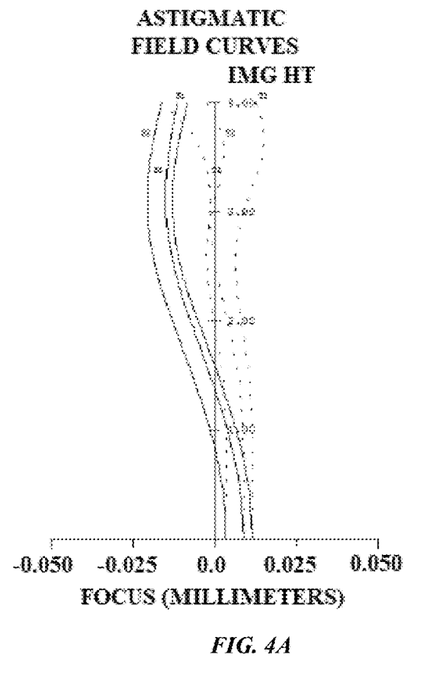
FIG. 4A shows a graph of field curve of the projection lens system for 1.2 m projection distance according to the first embodiment of the present invention.
Figure 4B:
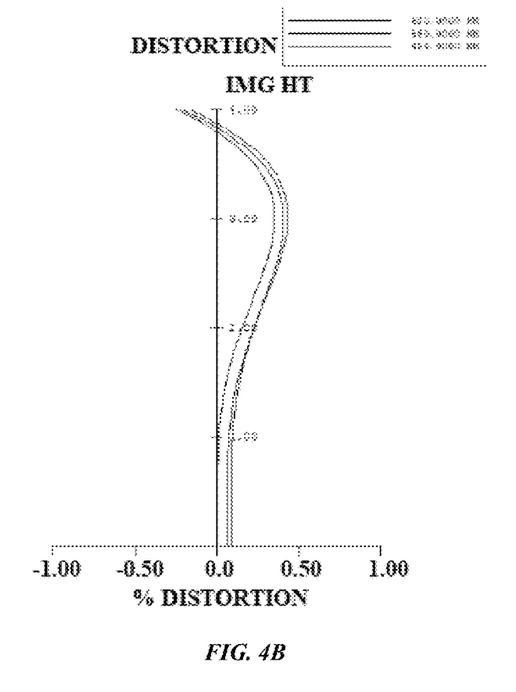
FIG. 4B shows a graph of distortion of the projection lens system for 1.2 m projection distance according to the first embodiment of the present invention.
Figure 5:
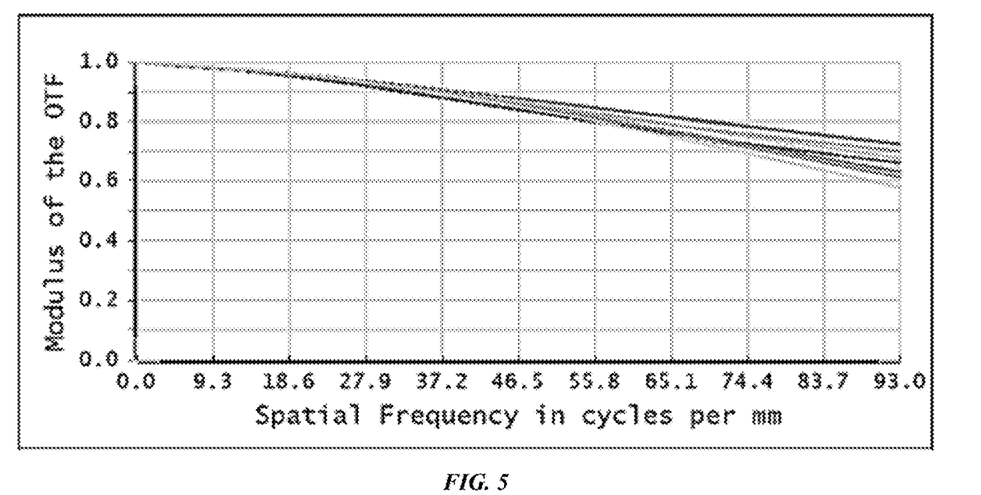
FIG. 5 shows a graph of MTF of the projection lens system for 0.6 m projection distance according to the first embodiment of the present invention.
Figure 6:
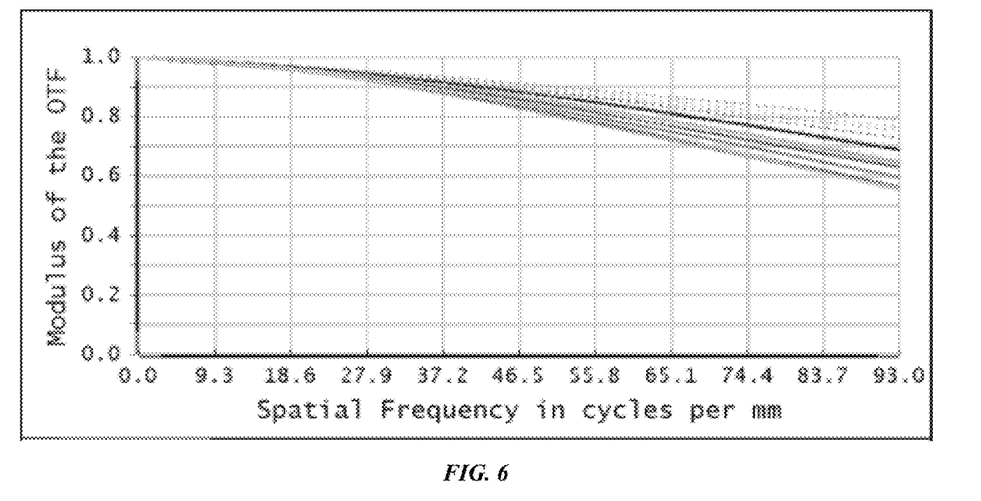
FIG. 6 a graph of MTF of the projection lens system for 3.0 m projection distance according to the first embodiment of the present invention.

FIGS. 3-6 show the MTF or field curve and distortion of the projection lens system 10 for different projection distances according to the first embodiment of the present invention. Specifically, FIG. 3 illustrates a graph of MTF of the projection lens system 10 for 1.2 m projection distance, and it can be seen that the projection lens system 10 of this invention has good quality of MTF, for example, MTF can be over 0.8 when the spatial frequency in cycles per mm is 46.5. The MTF can be above 0.6 at 93 lines/mm resolution cross all the fields. FIG. 4A illustrates a graph of field curve of the projection lens system for 1.2 m projection distance according to the first embodiment of the present invention. The projection lens system 10 of this invention can effectively reduce the field curve to less than 0.02 cross all the fields. FIG. 4B shows a graph of distortion of the projection lens system for 1.2 m projection distance according to the first embodiment of the present invention. The distortion of the projection lens system 10 of this invention can be controlled to be less than 0.5% cross all the field. FIGS. 5-6 shows a graph of MTF of the projection lens system for 0.6 m and 3.0 m projection distance respectively. It also can be seen that the projection lens system 10 of this invention has good quality of MTF for both the 0.6 m and 3.0 m projection distances. The MTF can be maintained around 0.6 cross all the fields for 0.6 m and 3.0 m projection distance by only adjusting the second lens group.

Figure 7:
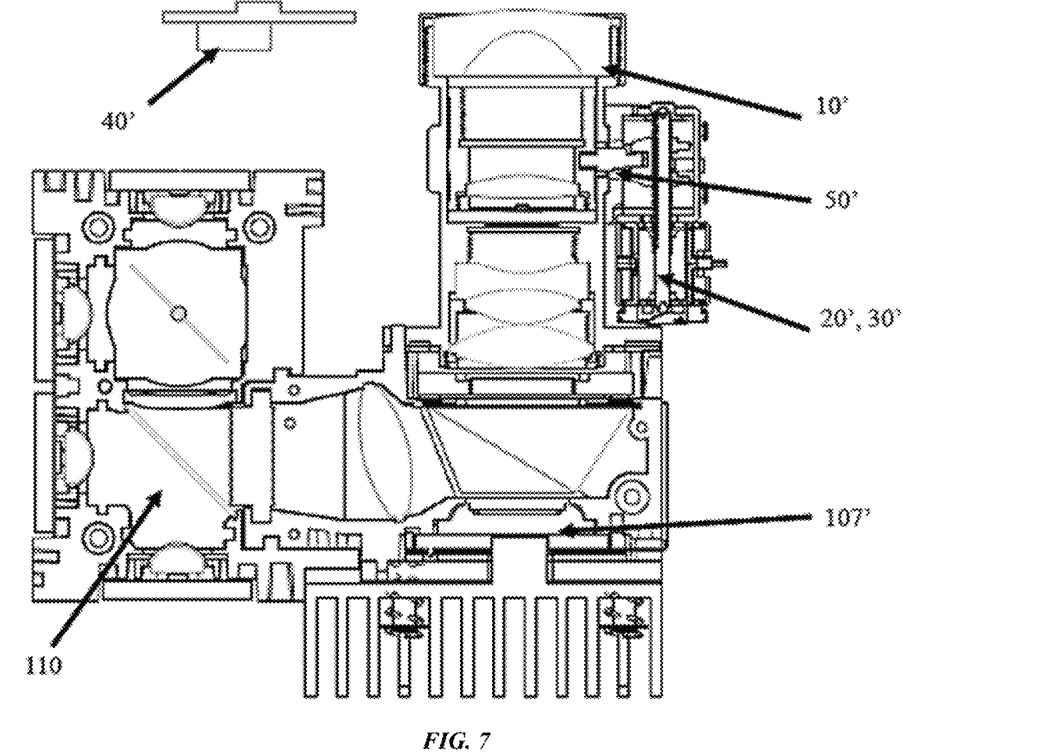
FIG. 7 illustrates a projection light engine including the autofocus projection apparatus according to the first embodiment of the present invention.

As an application of the autofocus projection apparatus of this invention, a projection light engine is shown in FIG. 7. The projection light engine comprises the autofocus projection apparatus, comprising a projection lens system 10'; a stepper motor 20'; a control board 30'; an adjustment level 50' and a time-of-flight (TOF) distance measurement module 40'. The projection lens system 10' has the same structure as the projection lens system 10 shown in the FIG. 2, i.e. comprising a first lens group, a second lens group, an aperture stop, a third lens group and a forth lens group arranged from a long conjugate side to a short conjugate side. The autofocus projection apparatus further comprises an inner lens barrel and an outer lens barrel, and wherein the inner lens barrel is used for enclosing the second lens group only and the outer lens barrel is used for enclosing the main projection lens body comprising the first, third and fourth lens groups, the inner lens barrel and the outer lens barrel have a tight tolerance fitting for smooth focusing adjustment. One end of the adjustment level 50' is connected to the inner lens barrel for enclosing said second lens group, and the other end of the adjustment level 50' is connected to the stepper motor 20' and the control board 30' so that the stepper motor 20' together with the control board 30' can control the movement of the second group lens through the adjustment level 50'. In the TOF distance detection module 40', it emits a beam of infrared light towards the object and calculates the time for the light to be reflected and is then able to calculate the distance from the TOF distance detection module 40' to the object. According to the calculated distance from the TOF distance detection module 40' and a look-up table or algorithm, which is written on the control board 30', the control board 30' can generate a control signal, which is used to control the stepper motor to move the inner lens barrel of the second lens group back and forth along the optical axis to a proper position by the adjustment level 50'. The motor 20' is used to automatically adjust the position of the second lens group of the projection lens system 10' for clear image on the screen based on the control signal.

The projection light engine further comprises a micro-display panel 107' and a light engine illumination system 110. The micro-display panel 107' is used to display the video images and the video images will be projected on a projection screen (not shown) through said projection lens system 10'. The light engine illumination system 110 may comprise at least a red, green and blue light beams which have been combined with dichroic mirrors into a co-axial light path without etendue increase and illuminate the micro-display panel 107' with uniform beam pattern.

This projection light engine has autofocus adjustment capability by only moving the second lens group with a small motor 20' for different projection distances and can compensate any defocus by lens assembly tolerance and thermal effect. In some cases, due to projection lens assembly tolerance and accuracy of look-up table for time-of-flight (TOF) detection algorithm, the image on the screen may be not clear and sharp. In order to address this issue, the projection light engine may comprise an infrared camera module. The infrared camera module is used to capture the image on the screen and an algorithm of the control board 30' is used to analysis the quality of the captured image, such as contrast ratio, so as to judge if the image displayed on the screen is clear and sharp or not. If the image is not clear and sharp, the motor 20' will move the second lens group in a small step to do re-focus and check if the image is in focus.

As an alternative, the TOF distance detection module can be a 3D TOF module, which can automatically correct the keystone distortion as well as be used for projection distance detection. The 3D TOF module can include an infrared VESEL or LED device and a CMOS camera sensor. The 3D TOF module can project a single modulated, flash light emitted by the infrared VESEL or LED device onto an object, which can be a projection screen. The light reflected by the object is captured by the CMOS camera sensor, which measures depth, amplitude and phase difference per pixel. The result is a highly reliable image of the distance or depth plus a gray-scale picture of the entire scene, which is used for keystone distortion correction. As one of alternative methods, the light source emitting the modulated flash light may be integrated into the light engine illumination system, or may be just acted as one light source of the light engine illumination system, so only a CMOS camera sensor is needed for the 3D TOF automatically keystone correction module.

Figure 8:
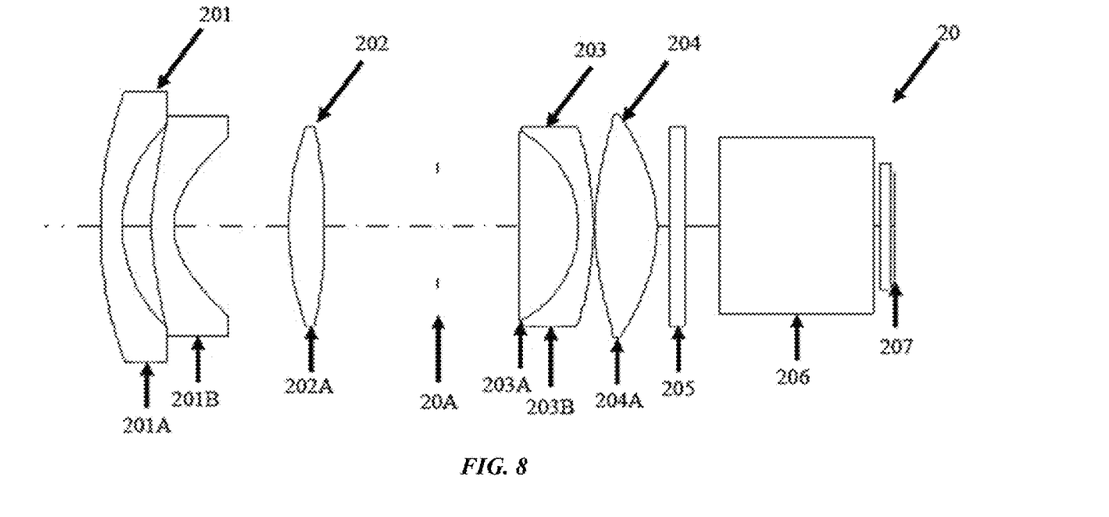
FIG. 8 illustrates an autofocus projection lens system according to the second embodiment of the present invention.

FIG. 8 illustrates an autofocus projection lens system according to the second embodiment of the present invention for a 6 pieces imaging lens system in a 0.33" DLP projection system. The projection lens system 20 comprises a first lens group 201, a second lens group 202, an aperture stop 20A, a third lens group 203 and a forth lens group 204 arranged from a long conjugate side to a short conjugate side. The first lens group 201 may have negative refractive power to collect wide field of view rays and for off-axis image aberration correction. The first lens group 201 may include a meniscus lens 201A and another meniscus aspherical surface lens 201B. The second lens group 202 may have positive refractive power for off-axis aberration correction and high order spherical aberration correction. The second lens group 202 may be just a single double-convex lens 202A. The second lens group 202 can be also used for projection distance focusing, tolerance compensation and "thermal defocus" compensation. The first lens group 201 and the second lens group 202 are arranged before the aperture stop 20A, and the combination of the first lens group 201 and the second lens group 202 has negative refractive power with focal-length between −300 mm and −500 mm. The third lens group 203 after the aperture stop 20A has positive refractive power, and may be a cemented lens made from a high refractive index material lens and a high Abbe value material lens for color aberration and spherical aberration. In the projection lens system 20, the third lens group 203 comprises a positive double-convex lens 203A made from low refractive index and high Abbe value glass material and a negative double-concave lens 203B made from high refractive index and low Abbe value glass material. The fourth lens group 204 may have a positive refractive power for high order aberration, color aberration and distortion correction. The fourth lens group 204 may include an aspherical surface lens 204A. The third lens group 203 and the fourth lens group 204 may be combined into one rear lens group lens, and the combination of the third lens group 203 and the fourth lens group 204 has positive refractive power with focal-length between 10 mm and 30 mm, preferably between 15 mm and 22 mm. The light reflected by the micro-display panel 207 will pass through the TIR prism 206 and a plate 205, and then emits through the fourth, third, second and first lens groups respectively and is finally projected on a projection screen. The projection lens system 20 is tele-centric lens system.

When the projection lens system 20 is applied to the projection display light engine, only a small motor is needed to move the second lens group back and forth along the optical axis during auto-focusing adjustment for a compact design. The projection lens system can be modified as long as meet the requirement of auto-focusing adjustment by only moving the second lens group. For example, the projection lens system can have auto-focusing adjustment by moving the third lens group back and forth along the optical axis.

Embodiments described above illustrate but do not limit the invention. It should also be understood that numerous modifications and variations are possible in accordance with the principles of the invention. Accordingly, the scope of the invention is defined only by the following claims.

The invention claimed is:

1. An autofocus projection apparatus, comprising:
a projection lens system comprising a first lens group, a second lens group, a third lens group and a fourth lens group arranged from a long conjugate side to a short conjugate side,
an inner lens barrel for enclosing the second lens group,
an outer lens barrel for enclosing the first lens group, the third lens group and the fourth lens group,
a motor, preferably a stepper motor, which is mounted on the outer lens barrel,
a control board, and
an adjustment level;
wherein one end of the adjustment level is connected to the inner lens barrel, and the other end thereof is connected to the motor;
wherein said motor moves said adjustment level based on a control signal sent by the control board, so as to move only the second lens group back and forth along an optical axis of the projection lens system during auto-focusing adjustment; and
wherein the focal-length of said projection lens system has a fine change during autofocus adjustment.

2. The autofocus projection apparatus of claim 1, wherein the projection lens system further comprises an aperture stop between the second lens group and the third lens group.

3. The autofocus projection apparatus of claim 1, wherein the second lens group comprises a single double-convex lens.

4. The autofocus projection apparatus of claim 2, wherein the first lens group has a negative refractive power, and is configured to collect wide field of view light and correct off-axis aberration;
wherein the second lens group has a positive refractive power, and is configured to correct off-axis aberration and high order spherical aberration;
wherein the third lens group has a positive refractive power, and can be a cemented lens for color aberration and spherical aberration; and
wherein the fourth lens group has a positive refractive power, and is used for high order aberration, color aberration and distortion correction.

5. The autofocus projection apparatus of claim 4, wherein the cemented lens of the third lens group comprises a negative double-concave lens made from high refractive index and low Abbe value glass material and a positive double-convex lens made from low refractive index and high Abbe value glass material.

6. The autofocus projection apparatus of claim 3, wherein the second lens group can be used for projection distance focusing, tolerance compensation with focal-length fine change.

7. The autofocus projection apparatus of claim 1, wherein the combination of said first lens group and said second lens group has positive refractive power with focal-length between 10 mm and 35 mm, preferably between 15 mm and 30 mm; and wherein the combination of the third lens group and the fourth lens group has positive refractive power with focal-length between 5 mm and 20 mm, preferably between 9 mm and 18 mm.

8. The autofocus projection apparatus of claim 1, wherein the combination of said first lens group and said second lens group has negative refractive power with focal-length between −275 mm and −525 mm, preferably between −300 mm and −500 mm; and wherein the combination of the third lens group and the fourth lens group has positive refractive power with focal-length between 10 mm and 30 mm, preferably between 15 mm and 22 mm.

9. The autofocus projection apparatus of claim 1, further comprising:
a time-of-flight (TOF) distance detection module to measure a projection distance;
wherein the TOF distance detection module emits a beam of modulated infrared light towards an object, calculates the time for the light to be reflected from the object, and calculates the projection distance from the TOF distance detection module to the object;
wherein the calculated projection distance is used to control the motor to move the second lens group to a proper position based on a look-up table and an algorithm, which are written on the control board; and
wherein it only takes less than 0.3 second to perform autofocus adjustment once.

10. The autofocus projection apparatus of claim 4, further comprising a thermal sensor for monitoring temperature changes around the outer lens barrel, wherein at least one group of the first lens group and the forth lens group comprises an aspherical plastic lens; when the thermal sensor monitors a temperature change, the control board generates a control signal based on the temperature change and control algorithm written on the control board, and sends to the motor, and then the motor moves the second lens group to perform thermal defocus automatic compensation based on the control signal.

11. A projection light engine with autofocus adjustment, comprising:
an autofocus projection apparatus, comprising:
a projection lens system comprising a first lens group, a second lens group, a third lens group and a fourth lens group arranged from a long conjugate side to a short conjugate side,
an inner lens barrel for enclosing the second lens group,
an outer lens barrel for enclosing the first lens group, the third lens group and the fourth lens group,
a motor mounted on the outer lens barrel,
a control board, and
an adjustment level;
a micro-display panel; and
a light engine illumination system;
wherein the micro-display panel is configured to display the video images and the images will be projected on a screen through said projection lens system;

wherein the light engine illumination system comprises at least a red, green and blue light beams which have been combined with dichroic mirrors into a co-axial light path without etendue increase and illuminate the micro-display panel with uniform beam pattern;

wherein one end of the adjustment level is connected to the inner lens barrel, and the other end thereof is connected to the motor; and wherein said motor moves said adjustment level based on a control signal sent by the control board, so as to move only the second lens group back and forth along an optical axis of the projection lens system during auto-focusing adjustment.

12. The projection light engine of claim 11, wherein the projection lens system further comprises an aperture stop between the second lens group and the third lens group.

13. The projection light engine of claim 11, wherein the second lens group comprises a single double-convex lens; and wherein the second lens group can be used for projection distance focusing, tolerance compensation with focal-length fine change.

14. The projection light engine of claim 12, wherein the first lens group has a negative refractive power, and is configured to collect wide field of view light and correct off-axis aberration;

the second lens group has a positive refractive power, and is configured to correct off-axis aberration and high order spherical aberration;

wherein the third lens group has a positive refractive power, and can be a cemented lens for color aberration and spherical aberration; and wherein the fourth lens group has a positive refractive power, and is used for high order aberration, color aberration and distortion correction.

15. The projection light engine of claim 11, wherein the combination of said first lens group and said second lens group has positive refractive power with focal-length between 10 mm and 35 mm, preferably between 15 mm and 30 mm; and wherein the combination of the third lens group and the fourth lens group has positive refractive power with focal-length between 5 mm and 20 mm, preferably between 9 mm and 18 mm.

16. The projection light engine of claim 13, further comprising:

a time-of-flight (TOF) distance detection module to measure a projection distance;

wherein the TOF distance detection module emits a beam of modulated infrared light towards an object, calculates the time for the light to be reflected from the object, and calculates the projection distance from the TOF distance detection module to the object;

wherein the calculated projection distance is used to control the motor to move the second lens group to a proper position based on a look-up table and an algorithm, which are written on the control board; and wherein it only takes less than 0.3 second to perform autofocus adjustment once.

17. The projection light engine of claim 16, further comprising:

a camera module for capturing the image on the screen; and an algorithm for analyzing if the image is clear and sharp;

wherein, if the image on the screen is not clear and sharp, the motor moves the second lens group in a small step to re-focus.

18. The projection light engine of claim 11, further comprising:

a 3D time-of-flight (TOF) module for automatic keystone distortion correction as well as projection distance detection;

wherein, said 3D TOF module comprises an infrared VESEL or LED light device for emitting a single modulated flash light and a CMOS camera sensor, wherein said 3D TOF module projects the single modulated flash light onto the screen, and the light reflected by the screen is captured by said CMOS camera sensor, which measures depth, amplitude and phase difference per pixel and is used for keystone distortion correction.

19. The projection light engine of claim 18, wherein the light device for emitting the single modulated flash light can be integrated into the light engine illumination system.

20. The projection light engine of claim 18, wherein the light device for emitting the single modulated flash light can be just one light source of the light engine illumination system, so that only a CMOS camera sensor is needed for the 3D TOF module to perform automatic keystone correction.

* * * * *